(12) United States Patent
Gross

(10) Patent No.: US 7,679,996 B2
(45) Date of Patent: Mar. 16, 2010

(54) METHODS AND DEVICE FOR ULTRASONIC RANGE SENSING

(76) Inventor: Robert Ray Gross, 8757 E. Chimney Spring Dr., Tucson, AZ (US) 85747

( * ) Notice: Subject to any disclaimer, the term of this patent is extended or adjusted under 35 U.S.C. 154(b) by 81 days.

(21) Appl. No.: 11/917,311

(22) PCT Filed: Jun. 13, 2006

(86) PCT No.: PCT/US2006/022869

§ 371 (c)(1),
(2), (4) Date: Dec. 12, 2007

(87) PCT Pub. No.: WO2006/138241

PCT Pub. Date: Dec. 28, 2006

(65) Prior Publication Data

US 2008/0202243 A1     Aug. 28, 2008

(51) Int. Cl.
*G01S 15/32* (2006.01)
(52) U.S. Cl. .............................. 367/99; 73/629; 73/627
(58) Field of Classification Search .................. 367/87, 367/99; 73/290 V, 627, 629
See application file for complete search history.

(56) References Cited

U.S. PATENT DOCUMENTS

| 4,700,569 | A | 10/1987 | Michalski et al. ............. 73/290 |
| 5,229,975 | A * | 7/1993 | Truesdell et al. .............. 367/99 |
| 5,483,501 | A * | 1/1996 | Park et al. .................... 367/140 |
| 5,631,875 | A | 5/1997 | Romes et al. ................. 367/99 |
| 5,671,190 | A | 9/1997 | Kroemer et al. .............. 367/99 |
| 6,062,070 | A | 5/2000 | Maltby et al. .............. 73/61.49 |
| 6,870,792 | B2 * | 3/2005 | Chiappetta ................... 367/98 |
| 7,098,669 | B2 * | 8/2006 | Carter ........................ 324/605 |

\* cited by examiner

*Primary Examiner*—Ian J Lobo
(74) *Attorney, Agent, or Firm*—Hayes Soloway P.C.

(57) ABSTRACT

A system and method for sensing proximity of an object includes a signal generator, which generates a plurality of signals. A transducer is in communication with the signal generator to receive the plurality of signals from the signal generator. The transducer is capable of transforming a plurality of signals from the signal generator into a plurality of ultrasonic waves. The plurality of ultrasonic waves includes a first ultrasonic wave and a second ultrasonic wave, wherein the first ultrasonic wave and the second ultrasonic wave are formed out of phase. The plurality of ultrasonic waves are directed toward and reflected by the object. The transducer receives the plurality of ultrasonic waves reflected by the object, which become a plurality of received ultrasonic waves. An analog to digital converter is in communication with the transducer. The received plurality of ultrasonic waves reflected by the object is communicated to the analog to digital converter by the transducer.

20 Claims, 8 Drawing Sheets

METHODS AND DEVICE FOR ULTRASONIC RANGE SENSING

FIELD OF THE INVENTION

The present invention is generally related to electronic sensors and more particularly is related to an ultrasonic sensor with improved range features.

BACKGROUND OF THE INVENTION

Range sensors are useful, for instance, in the construction and design of robots. Many ultrasonic range sensors have difficulty sensing proximate objects accurately within a meter of the sensor. As mobile robots programmed to perform specific automation sometimes need to operate with care toward proximate objects, it would be useful for a robot to be able to accurately sense proximate objects.

Ultrasonic range detectors that use only one range sensor cannot detect distances up to the front face of the sensor. These sensors have a proximity dead zone within which they are ineffective or inaccurate. A dead zone, in ultrasonic testing, is the interval following the initial pulse where the transducer ring down prevents detection or interpretation of reflected energy (echoes). In contact ultrasonic testing, the area just below the surface of a test object that can not be inspected because of the transducer is still ringing down and not yet ready to receive signals. Ultrasonic range detectors that use two range sensors cannot detect distances up to the front sensor face because the signal becomes blocked from sensor to sensor. These detectors also have a proximity dead zone within which they are ineffective or inaccurate. When objects are in a dead zone, the detector may or may not indicate something is in the dead zone. If it does indicate something is in the dead zone, these detectors will not be able to precisely identify the location of the object relative to the detector.

Thus, a heretofore unaddressed need exists in the industry to address the aforementioned deficiencies and inadequacies.

SUMMARY OF THE INVENTION

Embodiments of the present invention provide a system and method for sensing proximity of an object. Briefly described, in architecture, one embodiment of the system, among others, can be implemented as follows. The system contains a signal generator, which generates a plurality of signals. A transducer is in communication with the signal generator to receive the plurality or signals from the signal generator. The transducer is capable of transforming the plurality of signals from the signal generator into a plurality of ultrasonic waves. The plurality of ultrasonic waves includes a first ultrasonic wave and a second ultrasonic wave, wherein the first ultrasonic wave and the second ultrasonic wave are formed out of phase. The plurality of ultrasonic waves are directed toward and reflected by the object. The transducer receives the plurality of ultrasonic waves reflected by the object, which become a plurality of received ultrasonic waves. An analog to digital converter is in communication with the transducer. The received plurality of ultrasonic waves reflected by the object is communicated to the analog to digital converter by the transducer.

The present invention can also be viewed as providing methods for sensing proximity of an object. In this regard, one embodiment of such a method, among others, can be broadly summarized by the following steps: transmitting a first ultrasonic wave from a transducer; transmitting at least a second ultrasonic wave from the transducer, wherein the second ultrasonic wave is not in phase with the first ultrasonic wave; receiving the first ultrasonic wave with the transducer after the first ultrasonic wave reflects off of the object; receiving the second ultrasonic wave with the transducer after the second ultrasonic wave reflects off of the object and after the first ultrasonic wave is received; outputting the received first ultrasonic wave and second ultrasonic wave from the transducer to an analog to digital converter, whereby a change in signal characteristics during receipt of the first ultrasonic wave is indicative of an initial receipt of the second ultrasonic wave; and calculating range of the object based on time of receipt of the first ultrasonic wave and the second ultrasonic wave.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1A:
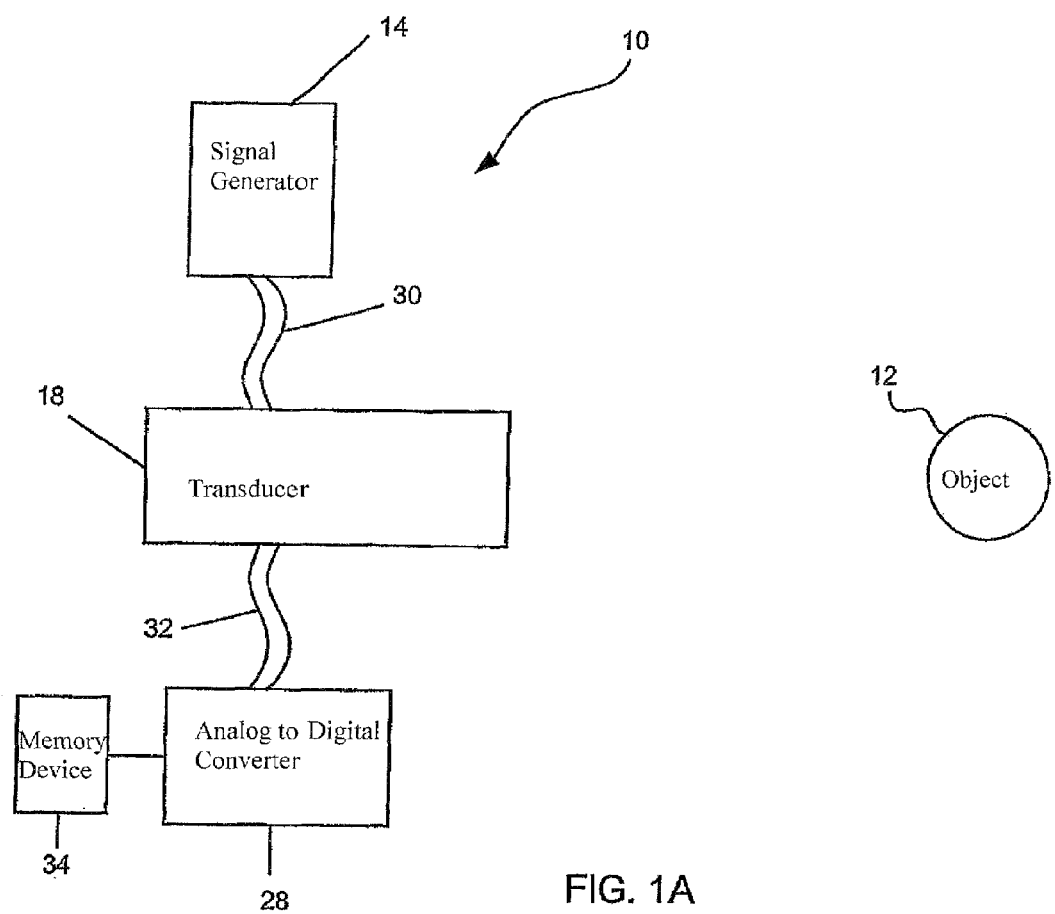
FIG. 1A, FIG. 1B, and FIG. 1C are block diagrams of a system for sensing proximity of an object, in accordance with a first exemplary embodiment of the invention.
Figure 1B:
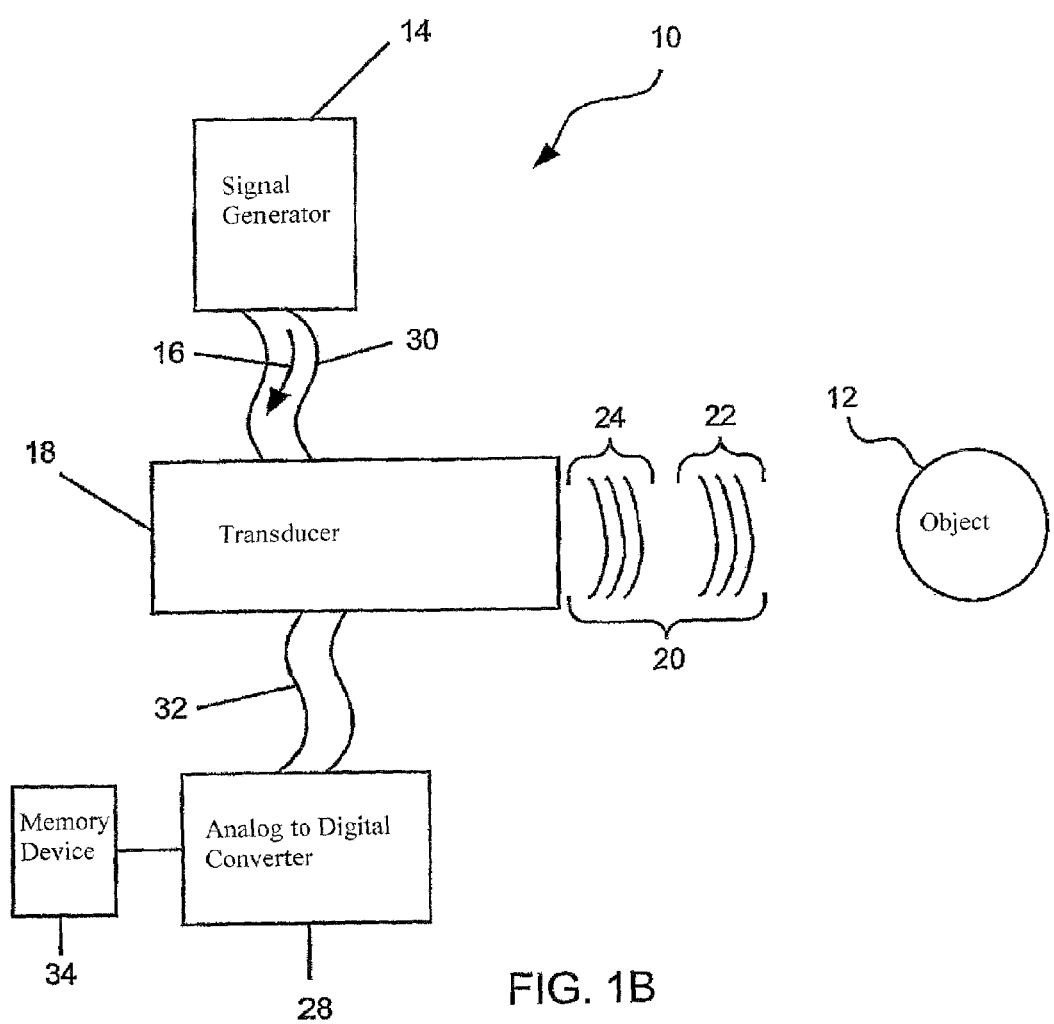
Figure 1C:
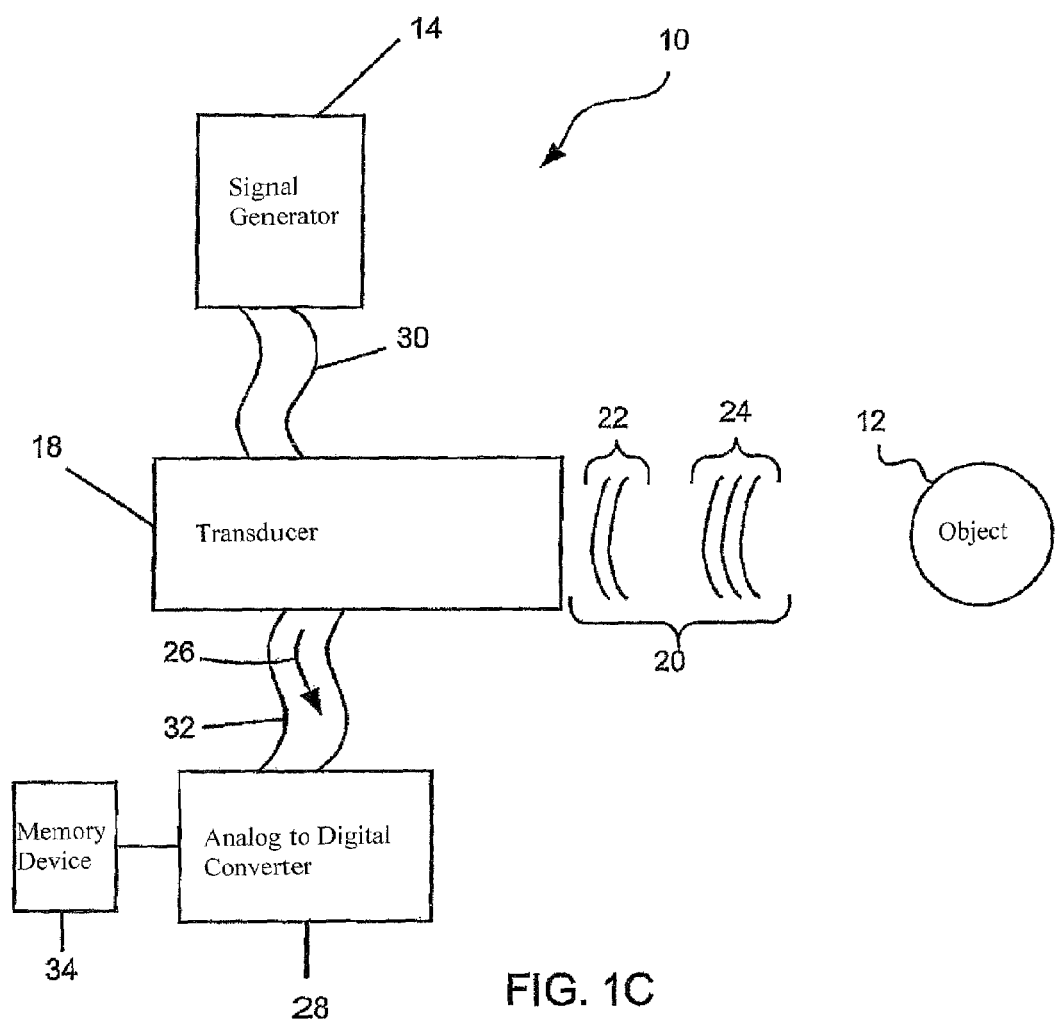

FIG. 1A, FIG. 1B, and FIG. 1C are a series of block diagrams of a system 10 for sensing proximity of an object 12, in accordance with a first exemplary embodiment of the invention. The system 10 includes a signal generator 14, which generates a plurality of signals 16. A transducer 18 is in communication with the signal generator 14 to receive the plurality of signals 16 from the signal generator 14. The transducer 18 is capable of transforming the plurality of signals 16 from the signal generator 14 into a plurality of ultrasonic waves 20. The plurality of ultrasonic waves 20 includes a first ultrasonic wave 22 and a second ultrasonic wave 24, wherein the first ultrasonic wave 22 and the second ultrasonic wave 24 are formed out of phase. The plurality of ultrasonic waves 20 are directed toward and reflected by the object 12. The transducer 18 receives the plurality of ultrasonic waves 20 reflected by the object 12, which become a plurality of received ultrasonic waves 26. An analog to digital converter 28 is in communication with the transducer 18. The received plurality of ultrasonic waves 26 reflected by the object 12 is communicated to the analog to digital converter 28 by the transducer 18.

The system 10 of FIG. 1A is shown in block diagram form with spaced apart elements for illustration purposes. In practice, the system 10 may be less than one cubic inch in size when some or all of the elements of the system 10 are mechanically interconnected.

FIG. 1B shows the signal generator 14 in communication with the transducer 18. As shown, electrical conductors 30 for communicating an electrical signal to the transducer 18 may connect the signal generator 14 to the transducer 18. Other mediums may be usable in place of the electrical conductors, depending on the type of signal generator 14 and the abilities of the transducer 18. For instance, the signals 16 communicated by the signal generator 14 may be optical or thermal, so long as the transducer 18 can convert that type of signal 16 into an ultrasonic wave.

In the first exemplary embodiment, the signal generator 14 may be a power source that excites the transducer 18 with a drive voltage. The drive voltage may be of sufficient amplitude that an acceptably high amplitude ultrasonic waveform 20 is output from the transducer 18. The ultrasonic waveform 20 should be such that it allows detection during the ring down period.

The transducer 18 may be a piezo electric transducer or any other type of transducer capable of performing the functions disclosed herein. The transducer 18 is capable of transforming the plurality of signals 16 into a plurality of ultrasonic waves 20. The ultrasonic waves 20 may be one continuous waveform, at any frequency supported by the transducer 18 (e.g., 40 KHz) consisting of a number of pulses. The plurality of ultrasonic waves 20 includes a first ultrasonic wave 22 and a second ultrasonic wave 24, wherein the first ultrasonic wave 22 and the second ultrasonic wave 24 are formed out of phase.

The first ultrasonic wave 22 and the second ultrasonic wave 24 may, for instance, be separated by a fraction of a wave, such as a ¼ wave (i.e., 12.5 uS for a 40 KHz wave). The first ultrasonic wave 22 and the second ultrasonic wave 24 may be separated by more than one wavelength as long as the separation is not a multiple of one wavelength (e.g., a two wave separation, or 100 uS for a 40 KHz wave, would not be preferred). As will be discussed herein, the desired effect is that the first ultrasonic wave 22 and the second ultrasonic wave 24 will not cancel each other out as one wave is heading toward the object 12 and the other wave is being reflected back from the object 12. The first ultrasonic wave 22 and the second ultrasonic wave 24 may have different wave characteristics, such as different frequencies or amplitudes.

A last portion of the plurality of ultrasonic waves 20 may be short so as to minimize the energy deposited at the last frequency received by the transducer 18. Minimizing the energy deposited may allow the transducer to ring down faster. The plurality of ultrasonic waves 20 may have a plurality of frequencies, a plurality of phase shifts, or a combination thereof. In this regard, the more variation between ultrasonic waves 20, the easier it will be to distinguish between the two waves, as will be discussed herein.

The object 12 reflects the plurality of ultrasonic waves 20, including the first ultrasonic wave 22 and the second ultrasonic wave 24, after the ultrasonic waves 20 transmitted by the transducer 18. The transducer 18 may be able to freely ring down and respond to the returning plurality of ultrasonic waves 20. In one possible alternative embodiment, a separate device may be provided and respond to the returning plurality of ultrasonic waves 20. Use of the transducer 18 for receiving the returning plurality of ultrasonic waves 20 reduces the number of parts for the system 10 and may make the device more cost effective.

The analog to digital converter 28 is in communication with the transducer 18. The analog to digital converter 28 may be connected to the transducer 18 by electrical conductors 32, although other means of communication between the transducer and the analog to digital converter 28 may be viable without departing from the scope of the invention. The received plurality of ultrasonic waves 26 reflected by the object 12 is communicated to the analog to digital converter 28 by the transducer 18. Prior to use, the system 10 may be calibrated to generate a base ring down pattern stored in a memory device 34 in communication with the analog to digital converter 28. When the object 12 is close, the received plurality of ultrasonic waves 26 has a pattern that deviates from the base ring down pattern.

The returning plurality of ultrasonic waves 20 is received by the transducer 18 and is added to a detector ring down through the analog to digital converter 28. The deviation between the detector ring down and the base ring down pattern is measured. The existence of a deviation may mean the object 12 is in close proximity (e.g., within three feet). A time of detection corresponds to a specific range corresponding to the speed of sound in the air and a range may be calculated.

The range to the object 12 can be approximated by the following formula:

$$\text{Range} = ((331.4 + 0.6\,Tc) * TOF)/2$$

where Range is the range in meters and Tc is the ambient temperature in degrees Celsius and TOF is the time of flight. Time of flight is extracted from the time that a particular section of the waveform was transmitted from the transducer 18 to the time that that exact section of the waveform returns to the transducer 18. When the object 12 is outside close proximity of the transducer 18, the object 12 may be detected using prior art detection methods.

Figure 2A:
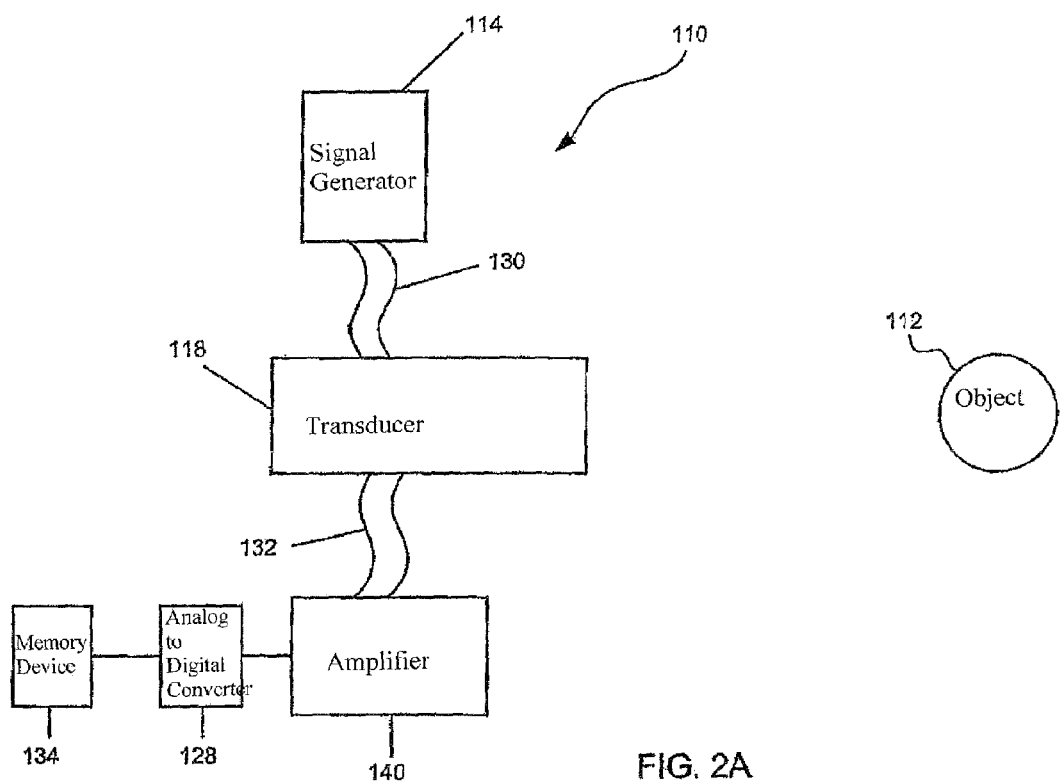
FIG. 2A, FIG. 2B, and FIG. 2C are block diagrams of a system for sensing proximity of an object, in accordance with a second exemplary embodiment of the invention.
Figure 2B:
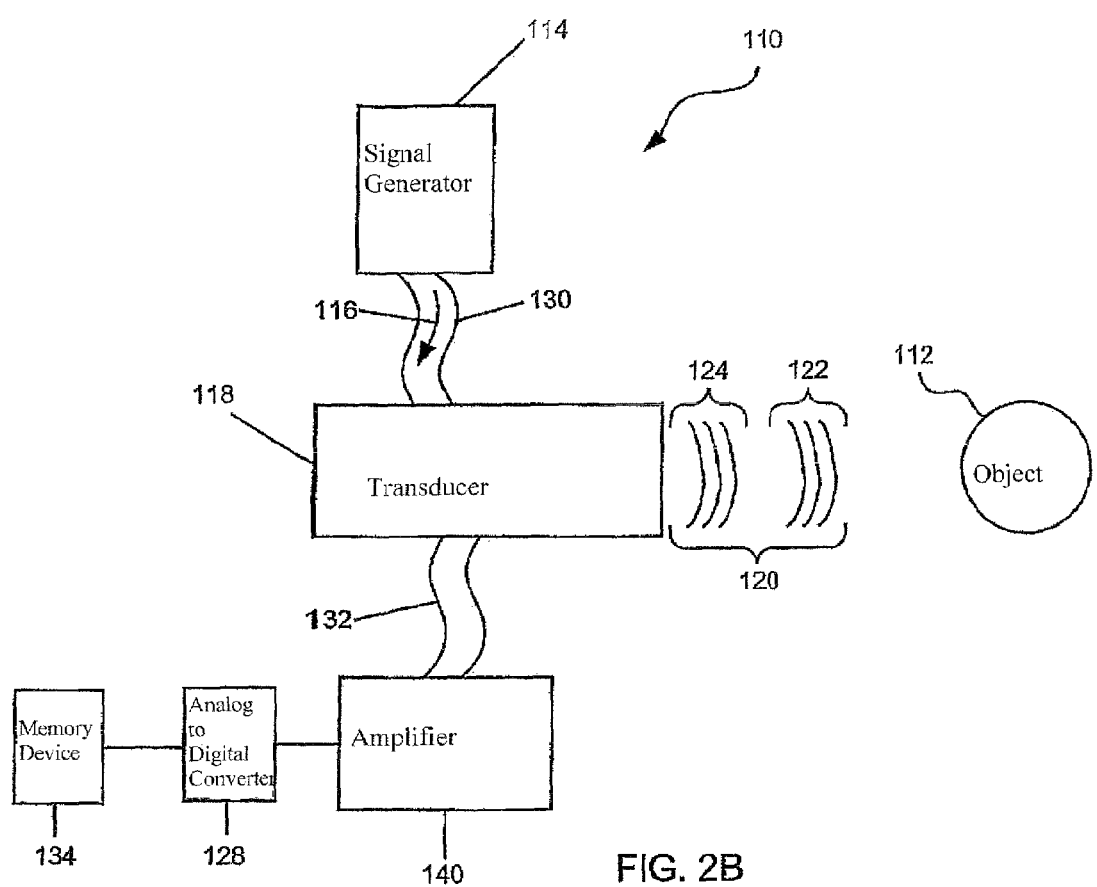
Figure 2C:
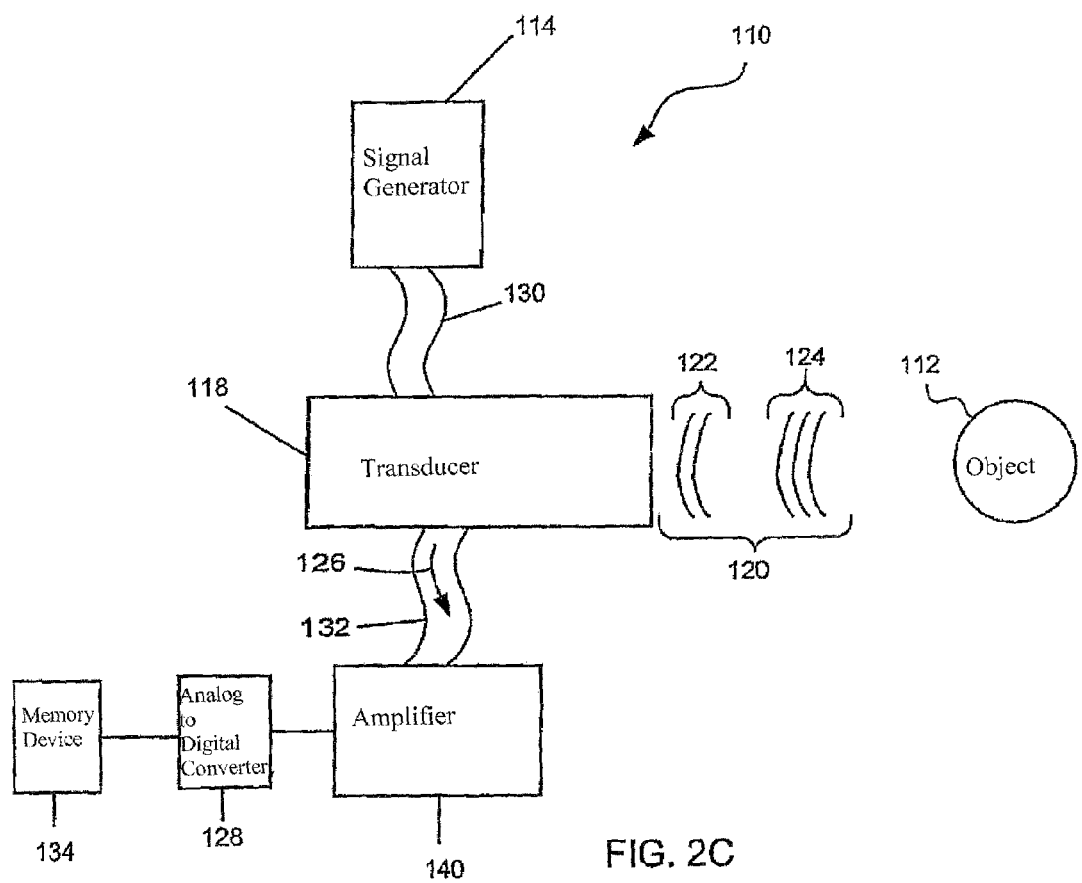

FIG. 2A, FIG. 2B, and FIG. 2C are a series of block diagrams of a system 110 for sensing proximity of an object 112, in accordance with a second exemplary embodiment of the invention. The system 110 includes a signal generator 114, which generates a plurality of signals 116. A transducer 118 is in communication with the signal generator 114 to receive the plurality of signals 116 from the signal generator 114. The transducer 118 is capable of transforming the plurality of signals 116 from the signal generator 114 into a plurality of ultrasonic waves 120. The plurality of ultrasonic waves 120 includes a first ultrasonic wave 122 and a second ultrasonic wave 124, wherein the first ultrasonic wave 122 and the second ultrasonic wave 124 are formed in different frequencies. The plurality of ultrasonic waves 120 are directed toward and reflected by the object 112. The transducer 118 receives the plurality of ultrasonic waves 120 reflected by the object 112, which become a plurality of received ultrasonic waves 126. An amplifier 140 is in communication with the transducer 118. The received plurality of ultrasonic waves 126 reflected by the object 112 is communicated to the amplifier 140 by the transducer 118 and, through the amplifier 140, to an analog to digital converter 128.

In the second exemplary embodiment, the signal generator 114 may be a power source that excites the transducer 118 with a drive voltage. The drive voltage may be of sufficient amplitude that an acceptably high amplitude ultrasonic waveform 120 is output from the transducer 118. The ultrasonic waveform 120 should be such that it allows detection during the ring down period.

The transducer 118 is capable of transforming the plurality of signals 116 into a plurality of ultrasonic waves 120. The ultrasonic waves 120 may be one continuous waveform, at any frequency supported by the transducer 18 (e.g., 40 KHz) consisting of a number of pulses. The plurality of ultrasonic waves 120 includes a first ultrasonic wave 122 and a second ultrasonic wave 124, wherein the first ultrasonic wave 122 and the second ultrasonic wave 124 are formed out of phase.

The first ultrasonic wave 122 and the second ultrasonic wave 124 may, for instance, be separated by a fraction of a wave, such as a ¼ wave (i.e., 12.5 uS for a 40 KHz wave). The first ultrasonic wave 122 and the second ultrasonic wave 124 may be separated by more than one wavelength as long as the separation is not a multiple of one wavelength (e.g., a two wave separation, or 100 uS for a 40 KHz wave, would not be preferred). The first ultrasonic wave 122 and the second ultrasonic wave 124 may have a frequency difference, for instance, as small as 2 KHz (e.g., the first ultrasonic wave 122 is 38 KHz and the second ultrasonic wave 124 is 40 KHz). As will be discussed herein, the desired effect is that the first ultrasonic wave 122 and the second ultrasonic wave 124 will not cancel each other out as one wave is heading toward the object 112 and the other wave is being reflected back from the object 112. The first ultrasonic wave 122 and the second ultrasonic wave 124 may have different wave characteristics, such as different phases, frequencies, or amplitudes.

The object 112 reflects the plurality of ultrasonic waves 120, including the first ultrasonic wave 122 and the second ultrasonic wave 124, after the ultrasonic waves 120 transmitted by the transducer 118. The transducer 118 may be able to freely ring down and respond to the returning plurality of ultrasonic waves 120. In one possible alternative embodiment, a separate device may be provided to freely ring down and respond to the returning plurality of ultrasonic waves 120. Use of the transducer 118 for receiving the returning plurality of ultrasonic waves 120 reduces the number of parts for the system 110 and may make the device more cost effective.

The amplifier 140 may remain connected to the transducer 118 during transmission of the plurality of ultrasonic waves 120, may be disconnected, may have the gain lowered, or otherwise arranged, so long as the amplifier 140 is able to receive the plurality of received ultrasonic waves 126 from the transducer 118 and respond during the ring down period. The amplifier 140 may be able to respond to the plurality of received ultrasonic waves 126 superimposed by the transducer 118 ring down. The response may include a phase shift and/or an amplitude change. The response will be transmitted to the analog to digital converter 128 for recording.

The received plurality of ultrasonic waves 126 reflected by the object 112 is communicated to the analog to digital converter 128 by the transducer 118, through the amplifier 140. Prior to use, the system 110 may be calibrated to generate a base ring down pattern stored in a memory device 134 in communication with the analog to digital converter 128. When the object 112 is close, the received plurality of ultrasonic waves 126 has a pattern that deviates from the base ring down pattern. The system 110 may be calibrated to generate the base ring down pattern in the memory device 134 when there is no object 112 in close proximity of the transducer 118. The system 110 may be calibrated to generate the base ring down pattern in the memory device 134 when the object 112 is a known distance within close proximity of the transducer 118. The system 110 may allow a plurality of base ring down patterns to be stored in the memory device 134, each base ring down pattern based on differing conditions.

The returning plurality of ultrasonic waves 120 is received by the transducer 118 and is added to a detector ring down through the analog to digital converter 128. The deviation between the detector ring down and the base ring down pattern is measured. The existence of a deviation may mean the object 112 is in close proximity (e.g., within three feet). A time of detection corresponds to a specific range corresponding to the speed of sound in the air and a range may be calculated. Further, if a plurality of base ring down patterns is recorded, the deviation between the detector ring down and the plurality of base ring down patterns may be measured to further define a location of the object 112.

The range to the object 112 can be approximated by the following formula:

$$\text{Range} = ((331.4 + 0.6\, Tc) * TOF)/2$$

where Tc is the ambient temperature in degrees Celsius and TOF is the time of flight. Time of flight is extracted from the time that a particular section of the waveform was transmitted from the transducer 118 to the time when that exact section of the waveform returns to the transducer 118. When the object 112 is outside close proximity of the transducer 118, the object 112 may be detected using prior art detection methods.

The phase of a portion of the returning plurality of received ultrasonic waves 126 can be such that it is not readily visible during ring down, but another portion of the waveform, (e.g., the second ultrasonic wave 124) reflecting from the same object 112 and under the conditions, can be used to provide a reading that is more readily visible. The results from all measurements can be analyzed and the best distance estimation extracted. The plurality of received ultrasonic waves 126 can be analyzed and data extracted that allows the temporal placement of the plurality of received ultrasonic waves 126 superimposed upon ring down. This temporal placement, together with the known speed of sound, yields the distance to a close object.

The bandwidth requirements for the analog to digital converter 128 may be reduced if the received plurality of ultrasonic waves 126 from the amplifier 140 is fed into an integrator, an envelope detector, a phase detector, and/or a peak detector. These devices may be used to increase the accuracy of the distance measurement produced through the analog to digital converter 128. If one or all of these devices are incorporated into the system 110, they will be fed by the amplifier 140 and will transmit output to the analog to digital converter 128.

The system 110 may further include a thermometer for detecting the temperature of the medium in which the plurality of ultrasonic waves 120 is transmitted. Temperature may have an impact on the speed of the transmission of the plurality of ultrasonic waves 120 and, therefore, may be useful in accurately determining the distance of the object 112 from the transducer 118. The output of the thermometer may be fed into the analog to digital converter 128.

The system 110 may be capable of determining the distance between the transducer 118 and the object 112 when the object 112 is between approximately zero meters and approximately ten meters from the transducer 118. The system 110 may be capable of determining the distance between the transducer 118 and the object 112 when the object 112 is between approximately zero meters and approximately 6.5 meters from the transducer 118. The system 110 may be capable of determining the distance between the transducer 118 and the object 112 when the object 112 is between approximately 0.15 meters and approximately 6.5 meters from the transducer 118 with an accuracy of approximately +/−0.03 meters. An accuracy of 1.0% of the range, or better, is achievable in practice with care in the software and if ambient temperature is included in the calculations. The system 110 may identify a distance between the transducer 118 and the object 112 when the object 112 is less than approximately 0.15 meters from the transducer 118 simply as a distance within approximately 0.15 meters.

The transducer 118 may transmit the plurality of ultrasonic waves 120 toward the object 112 with a beam up to approximately fifty degrees wide in the second exemplary embodiment, although other beam widths or other signal geometries are conceivable without departing from the scope of the present invention.

Figure 3:
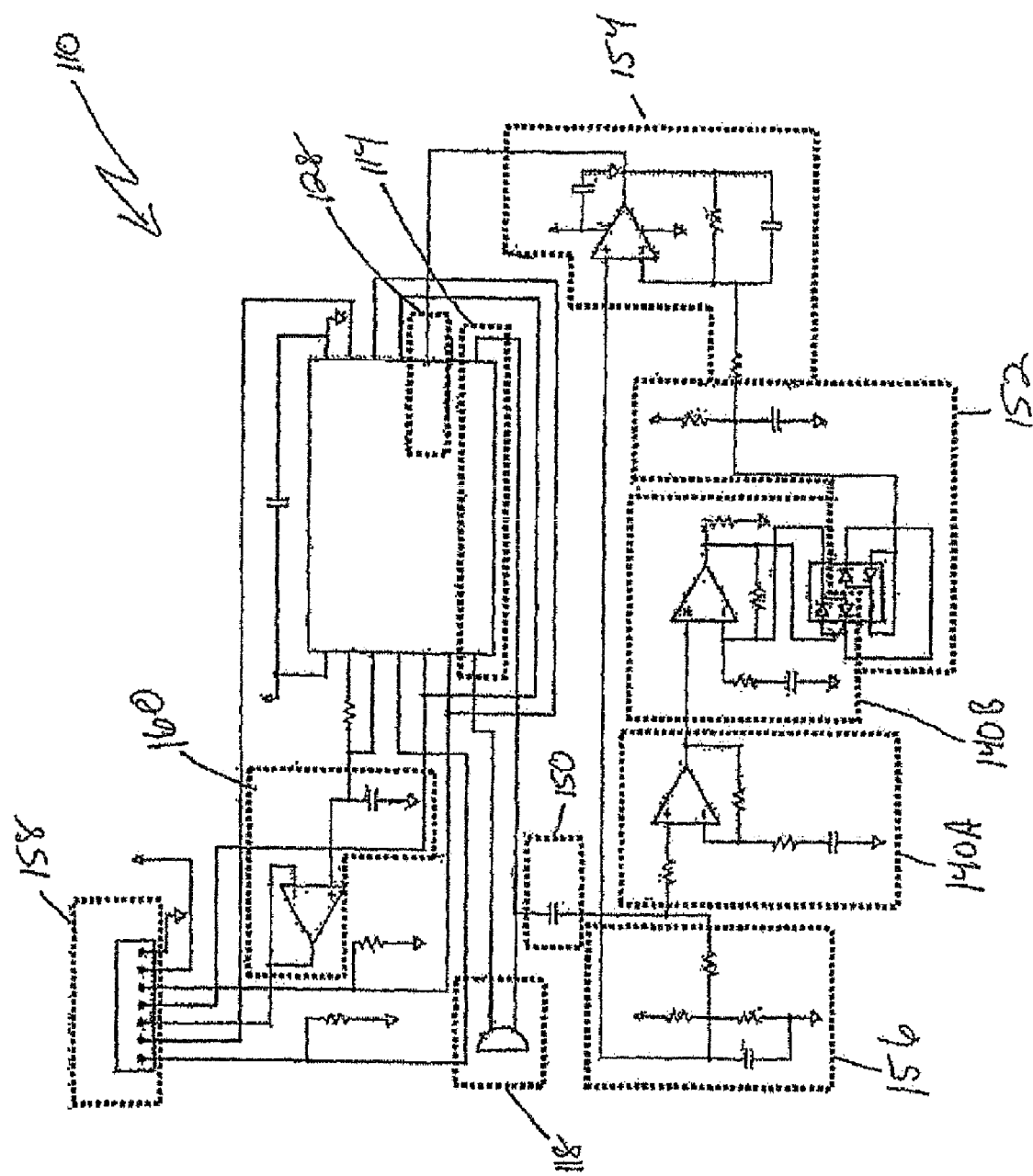
FIG. 3 is a circuit diagram of a circuit for implementing the system for sensing proximity of the object, in accordance with the second exemplary embodiment of the invention.

FIG. 3 is a circuit diagram of a circuit for implementing the system 110 for sensing proximity of the object 112, in accordance with the second exemplary embodiment of the invention. The circuit diagram shows the signal generator 114 in communication with the transducer 118. Amplifiers 140A, 140B are connected to the transducer through a capacitor 150. The amplifiers 140A, 140B, in this embodiment, contain band pass filters and the second of the amplifiers 140B includes a diode pair that can be used to make the amplifier 140B a logarithmic amplifier. A peak detector 152 is connected to the second of the amplifiers 140B and an integrator 154 with a filter is connected to the peak detector 152. The analog to digital converter 128 is connected to the integrator 154.

FIG. 3 shows additional elements of the second exemplary embodiment. A voltage reference 156 is provided for the benefit of the operation of the amplifiers 140A, 140B. A user interface 158 includes a serial output representing the range, an analog voltage output representing the range, and a pulse width output representing the range. All three of these elements may be active at the same time. An analog voltage buffer 160 is provided for stable voltage. The circuit diagram of FIG. 3 represents only one embodiment of the present invention and other embodiments may be devised.

Figure 4:
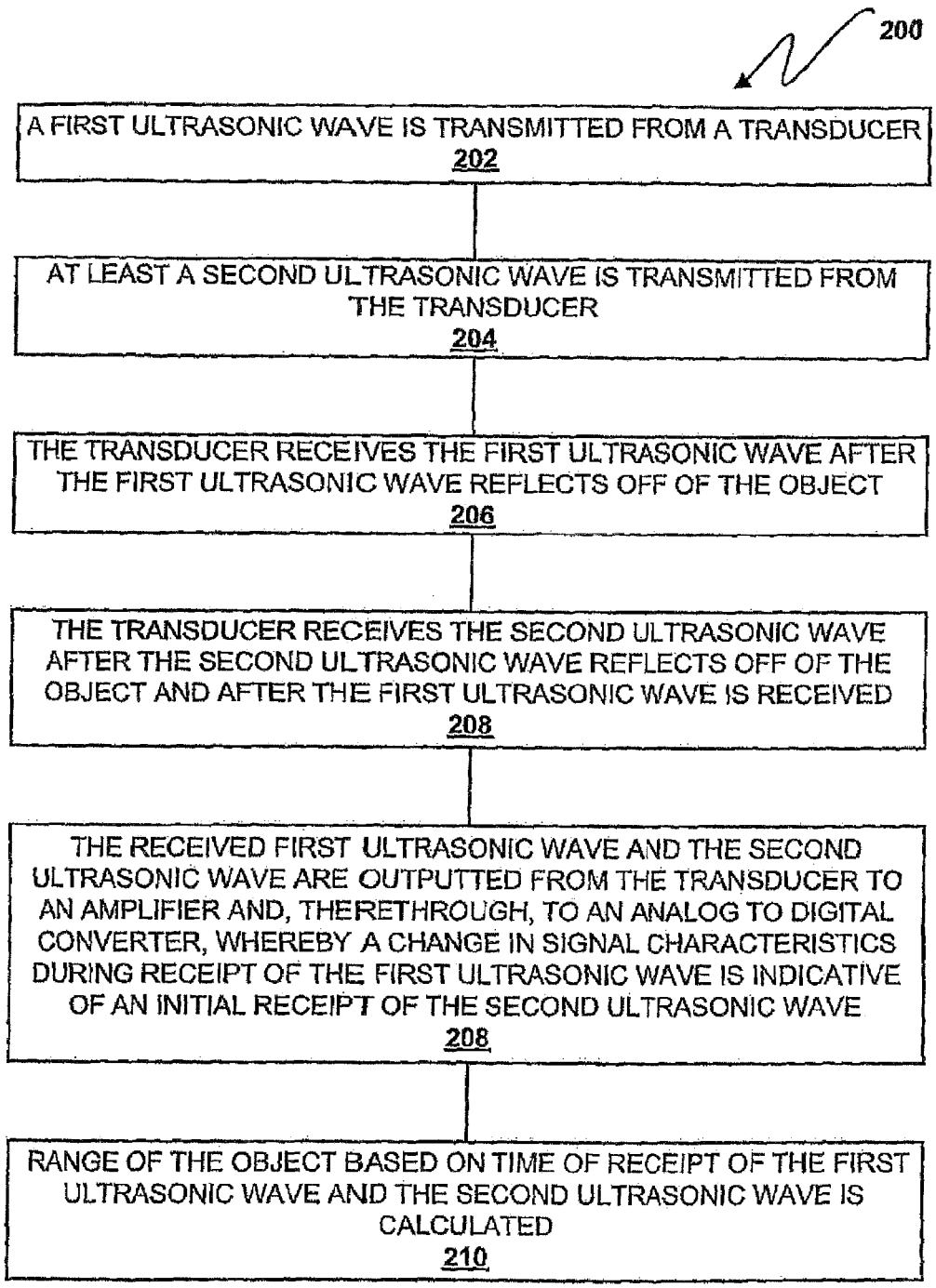
FIG. 4 is a flowchart illustrating a method of sensing proximity of an object.

FIG. 4 is a flowchart 200 illustrating a method of providing the above-mentioned a system 110 for sensing proximity of an object 112 in accordance with the second exemplary embodiment of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved.

As is shown by block 202, a first ultrasonic wave 122 is transmitted from a transducer 118. At least a second ultrasonic wave 124 is transmitted from the transducer 118 (block 204). The second ultrasonic wave 124 is not in phase with the first ultrasonic wave 122 and/or has a different frequency relative to the first ultrasonic wave 122. The transducer 118 receives the first ultrasonic wave 122 after the first ultrasonic wave 122 reflects off of the object 112 (block 206). The transducer 118 receives the second ultrasonic wave 124 after the second ultrasonic wave 124 reflects off of the object 112 and after the first ultrasonic wave 122 is received (block 208). The received first ultrasonic wave 122 and the second ultrasonic wave 124 are outputted from the transducer 118 to an amplifier 140 and, therethrough, to an analog to digital converter 128, whereby a change in signal characteristics during receipt of the first ultrasonic wave 122 is indicative of an initial receipt of the second ultrasonic wave 124 (block 210). Range of the object 112 based on time of receipt of the first ultrasonic wave 122 and the second ultrasonic wave 124 is calculated (block 212).

The received first ultrasonic wave 122 and second ultrasonic wave 124 may be amplified with an amplifier 140 before outputting the first ultrasonic wave 122 and the second ultrasonic wave 124 to the analog to digital converter 128. The transducer 118 may be calibrated by transmitting a base ultrasonic wave without the object 112 in close proximity to the transducer 118, thereby generating a base ring down pattern. The base ring down pattern may then be stored in a memory device 134. An ambient temperature may be sensed and transmitted to the analog to digital converter 128.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for sensing proximity of an object, the system comprising:
   a signal generator;
   a plurality of signals generated by the signal generator;
   a transducer in communication with the signal generator to receive the plurality of signals from the signal generator, wherein the transducer is capable of transforming the plurality of signals from the signal generator into a plurality of ultrasonic waves;
   the plurality of ultrasonic waves includes a first ultrasonic wave and a second ultrasonic wave, wherein the first ultrasonic wave and the second ultrasonic wave are formed out of phase;
   the plurality of ultrasonic waves are at least partially directed toward and reflected by the object;
   the transducer receiving the plurality of ultrasonic waves reflected by the object;
   an analog to digital converter in communication with the transducer, wherein the received plurality of ultrasonic waves reflected by the object are communicated to the analog to digital converter by the transducer; and
   a detector that measures a deviation between a detector ring down pattern and a base ring down pattern.

2. The system of claim 1, wherein the plurality of ultrasonic waves further comprises wave characteristics and wherein the first ultrasonic wave and the second ultrasonic wave in the plurality of ultrasonic waves have different wave characteristics.

3. The system of claim 1, further comprising an amplifier in communication with the transducer and the analog to digital converter.

4. The system of claim 3, further comprising an integrator in communication with the amplifier and the analog to digital converter.

5. The system of claim 3, further comprising an envelope detector in communication with the amplifier and the analog to digital converter.

6. The system of claim 3, further comprising a peak detector in communication with the amplifier and the analog to digital converter.

7. The system of claim 3, further comprising a phase detector in communication with the amplifier and the analog to digital converter.

8. The system of claim 1, further comprising a thermometer in communication with the analog to digital converter.

9. The system of claim 1, further comprising a memory device in communication with the analog to digital converter.

10. The system of claim 1, further comprising a user interface in communication with the signal generator, the user interface comprising a serial output, an analog voltage output, and a pulse width output.

11. The system of claim 10, wherein the serial output, the analog voltage output, and the pulse width output are concurrently active.

12. A method of sensing proximity of an object, said method comprising the steps of:
transmitting a first ultrasonic wave from a transducer;
transmitting at least a second ultrasonic wave from the transducer, wherein the second ultrasonic wave is not in phase with the first ultrasonic wave;
receiving the first ultrasonic wave with the transducer after the first ultrasonic wave reflects off of the object;
receiving the second ultrasonic wave with the transducer after the second ultrasonic wave reflects off of the object and after the first ultrasonic wave is received;
outputting the received first ultrasonic wave and second ultrasonic wave from the transducer to an analog to digital converter;
detecting a deviation between a detector ring down pattern and a base ring down pattern whereby a change in signal characteristics during receipt of the first ultrasonic wave is indicative of an initial receipt of the second ultrasonic wave; and
calculating range of the object based on time of receipt of the first ultrasonic wave and the second ultrasonic wave.

13. The method of claim 12, further comprising the step of amplifying the received first ultrasonic wave and second ultrasonic wave from the transducer before outputting the first ultrasonic wave and the second ultrasonic wave to the analog to digital converter.

14. The method of claim 12, further comprising the step of calibrating the transducer by transmitting a base ultrasonic wave without the object in close proximity to the transducer, thereby generating a base ring down pattern.

15. The method of claim 14, wherein the base ring down pattern is stored in a memory device.

16. The method of claim 12, further comprising the step of sensing an ambient temperature and transmitting information regarding the sensed ambient temperature to the analog to digital converter.

17. A system for sensing proximity of objects, the system comprising:
means for transmitting a first ultrasonic wave;
means for transmitting at least a second ultrasonic wave, wherein the second ultrasonic wave is not in phase with the first ultrasonic wave;
means for receiving the first ultrasonic wave after the first ultrasonic wave reflects off of the object;
means for receiving the second ultrasonic wave after the second ultrasonic wave reflects off of the object and after the first ultrasonic wave is received;
means for measuring a deviation between a detector ring down pattern and a base ring down pattern; and
means for calculating range of the object based on time of receipt of the first ultrasonic wave and the second ultrasonic wave.

18. The system of claim 17, further comprising means for determining an ambient temperature and means for including the ambient temperature in the means for calculating range of the object.

19. The system of claim 17 further comprising means for amplifying the received first ultrasonic wave and the received second ultrasonic wave.

20. The system of claim 17 further comprising means for calibrating the system.

* * * * *